United States Patent
Kong

(10) Patent No.: US 7,926,842 B2
(45) Date of Patent: Apr. 19, 2011

(54) AIRBAG FOR FRONT PASSENGER SEAT FOR VEHICLE AND MANUFACTURING METHOD THEREOF

(75) Inventor: Byung Seok Kong, Gunpo-si (KR)

(73) Assignee: Hyundai Motor Company, Seoul (KR)

( * ) Notice: Subject to any disclaimer, the term of this patent is extended or adjusted under 35 U.S.C. 154(b) by 526 days.

(21) Appl. No.: 11/776,007

(22) Filed: Jul. 11, 2007

(65) Prior Publication Data

US 2008/0136146 A1   Jun. 12, 2008

(30) Foreign Application Priority Data

Dec. 6, 2006  (KR) .................. 10-2006-0123069

(51) Int. Cl.
*B60R 21/205*  (2006.01)
*B60R 21/215*  (2006.01)
(52) U.S. Cl. .................... 280/732; 280/728.3
(58) Field of Classification Search ............. 280/728.3, 280/732; *B60R 21/20*
See application file for complete search history.

(56) References Cited

U.S. PATENT DOCUMENTS

| | | | | |
|---|---|---|---|---|
| 5,458,361 | A * | 10/1995 | Gajewski | 280/728.3 |
| 6,042,139 | A * | 3/2000 | Knox | 280/728.3 |
| 6,742,803 | B2 * | 6/2004 | Ueno et al. | 280/728.3 |
| 6,835,439 | B1 * | 12/2004 | Kondo et al. | 428/156 |
| 7,063,349 | B2 * | 6/2006 | Takahashi | 280/728.2 |
| 2001/0000937 | A1 | 5/2001 | Winget et al. | |

FOREIGN PATENT DOCUMENTS

| | | | | |
|---|---|---|---|---|
| JP | 10-1021 | A | * | 1/1998 |
| JP | 10-053087 | | | 2/1998 |
| JP | 10-076544 | | | 3/1998 |
| JP | 10-250519 | A | * | 9/1998 |
| JP | 11-208399 | | | 8/1999 |
| JP | 11-208399 | A | * | 8/1999 |
| JP | 2001-294060 | | | 10/2001 |
| JP | 2001-294060 | A | * | 10/2001 |
| JP | 2002-225666 | | | 8/2002 |
| JP | 2003-146173 | A | * | 5/2003 |
| JP | 2004-034758 | | * | 2/2004 |
| KR | 10-2005-0000377 | | | 10/2005 |
| WO | WO 03/084729 | | | 10/2003 |
| WO | WO 2004030892 | A1 | * | 4/2004 |

\* cited by examiner

*Primary Examiner* — Ruth Ilan
(74) *Attorney, Agent, or Firm* — Morgan, Lewis & Bockius LLP

(57) ABSTRACT

An apparatus includes an airbag door that opens during deployment of an airbag, and a crash pad integrally injection-molded with the airbag door. The airbag door may include a tear groove, torn during the deployment of the airbag; a slanted part; and a variable part, a thickness of which varies. The crash pad may include an insertion part which contacts the slanted part of the airbag door to support the airbag door when the airbag door opens. A method includes simultaneously injecting materials of a crash pad and an airbag door with an upper and a lower mold and a slide mold coupled to one another such that the airbag door is integrally injection molded with the crash pad, retreating the molds, and removing the airbag door by moving the slide mold.

4 Claims, 3 Drawing Sheets

AIRBAG FOR FRONT PASSENGER SEAT FOR VEHICLE AND MANUFACTURING METHOD THEREOF

CROSS-REFERENCE TO RELATED APPLICATION

This application claims priority to, and the benefit of, Korean Patent Application No. 10-2006-0123069, filed in the Korean Intellectual Property Office on Dec. 6, 2006, the entire contents of which are incorporated herein by reference.

BACKGROUND OF THE INVENTION (a) Field of the Invention

The present invention relates to an airbag for a front passenger seat for a vehicle and a manufacturing method thereof in which an airbag door is integral with a crash pad.

(b) Description of the Related Art

A conventional airbag for a front passenger seat includes an airbag housing equipped with an airbag within a crash pad, a door plate which is mounted to the crash pad in front of the airbag housing and is provided with a rotation part, a chute for coupling the airbag housing to the crash pad, and an airbag door disposed in front of the crash pad.

To deploy the airbag, pressure is applied to the door plate, and a tear line on the door cover is torn to permit the airbag to deploy therethrough.

In a conventional method for forming the airbag door, the crash pad is formed by injection molding, and after the crash pad is solidified to some degree, the airbag door is formed by injection molding.

Remaining stress in the solidified crash pad may occur at a boundary surface of the airbag door which contacts the crash pad, so whitening and scratching of the material may occur while the airbag door is taken out and cooled. Furthermore, sink marks may be generated due to excessive thickness of the bonding part of the boundary surface.

SUMMARY OF THE INVENTION

An apparatus includes an airbag door that opens during deployment of an airbag, and a crash pad integrally injection-molded with the airbag door. The airbag door may include a tear groove, torn during the deployment of the airbag; a slanted part; and a variable part, a thickness of which varies. The crash pad may include an insertion part which contacts the slanted part of the airbag door to support the airbag door when the airbag door opens. The sectional shape of the tear groove may have a shape of "/\" or "H". The airbag door may be made of TPO material, and the crash pad may be made of PPF material. Valve gate timing for the injection molding may utilize a temperature sensor.

A method includes simultaneously injecting materials of a crash pad and an airbag door with an upper and a lower mold and a slide mold coupled to one another such that the airbag door is integrally injection molded with the crash pad, retreating the molds, and removing the airbag door by moving the slide mold. The injecting may include regulating a filling speed of the airbag door such that the airbag door material is prevented from extending beyond the region of the airbag door.

DETAILED DESCRIPTION OF THE PREFERRED EMBODIMENTS

Figure 1:
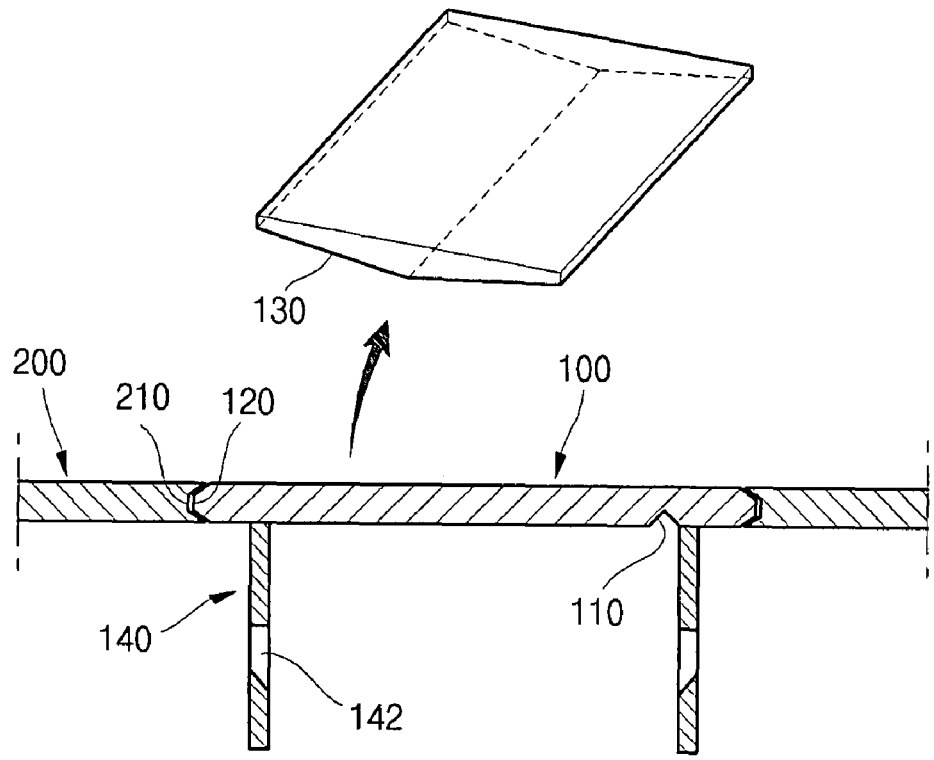
FIG. 1 shows an airbag for a front passenger seat for a vehicle according to an exemplary embodiment of the present invention.

Exemplary embodiments of the present invention will hereinafter be described in detail with reference to the accompanying drawings.

Referring to FIG. 1 to FIG. 4C, an airbag for a front passenger seat according to an exemplary embodiment of the present invention is provided with an airbag door 100 which rotates outwardly during airbag deployment. The airbag door 100 includes a tear groove 110 which is torn by deploy pressure of the airbag, a slanted part 120 at both ends of the airbag door 100, and a variable part 130, a thickness of which varies with respect to a lower center of an airbag door body. The airbag includes: a chute part 140 at a lower part of the airbag door 100 which extends rearward. The chute part 140 includes a mount hole 142 connected to an airbag housing. A crash pad 200 is injection molded integrally with the airbag door 100 and is provided with an insertion part 210 which contacts the slanted part 120 of the airbag door 100 to support the airbag door 100 when the airbag door 100 outwardly rotates.

A sectional shape of the tear groove 110 of the airbag door 100 may have a shape of "/\" or "H".

The airbag door 100 is made of TPO material so that its performance is reliable over a wide temperature range. The crash pad is made of PPF material and is formed by an injection mold in a shape of an ellipse such that the filling is performed only at a region of the airbag door.

A temperature sensor 10 is disposed below the airbag door 100, to provide precise valve gate timing for the simultaneous injection mold of the airbag door 100 and the crash pad 200.

A manufacturing method of an airbag for a front passenger seat for a vehicle according to an exemplary embodiment of the present invention includes: a material injection step of injecting materials of both the crash pad 200 and the airbag door 100 in a state that upper and lower molds 2 and 4 and a slide mold 5 are coupled to one another such that the airbag door 100 is integrally injection molded with the crash pad 200; a mold retreat step of retreating the upper and the lower molds 2 and 4 and the slide mold 5 after the injection step; and an airbag door taking out step of taking out the airbag door 100 by moving the slide mold 5 forward after the forming of the airbag door 100.

The material injection step further includes a filling speed regulation step of regulating a filling speed to form the airbag door 100 such that material is prevented from being filled beyond the boundaries of the airbag door 100.

Figure 4A:
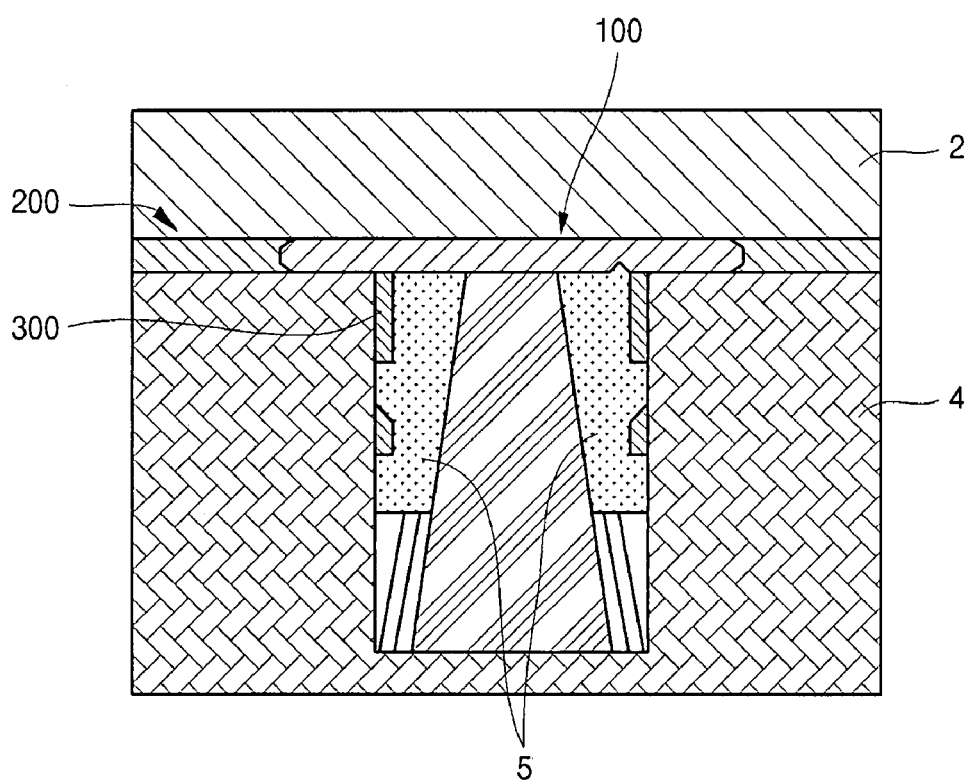
FIG. 4A to FIG. 4C show a manufacturing method of an airbag for a front passenger seat for a vehicle according to an exemplary embodiment of the present invention.

In more detail, referring to FIG. 4A, in order to form the airbag door 100 on the crash pad 200, the upper and the lower molds 2 and 4 are coupled to one another as shown in the drawing. At the material injection step, materials are simultaneously injected to the airbag door 100 and the crash pad 200 by separate injectors (not shown).

Figure 4B:
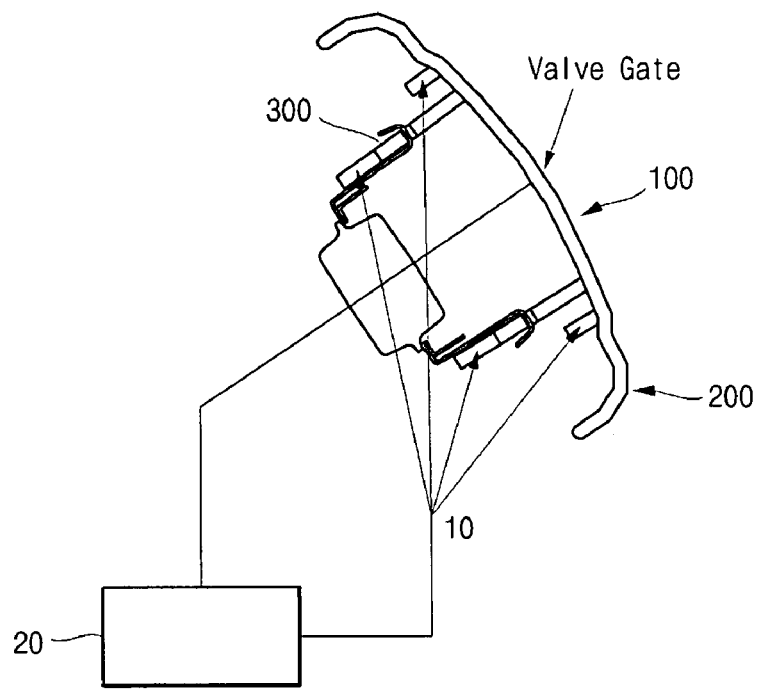

Referring to FIG. 4B, in order to integrally form the airbag door 100 and the crash pad 200 which are made of different materials, temperature information detected by the temperature sensor 10 is input to a valve gate controller 20. The valve gate controller 20 controls valve timing such that material fills the necessary regions.

That is, the region of the airbag door 100 is filled with TPO material, and the region of the crash pad 200 is simultaneously filled with PPF material.

Figure 3:
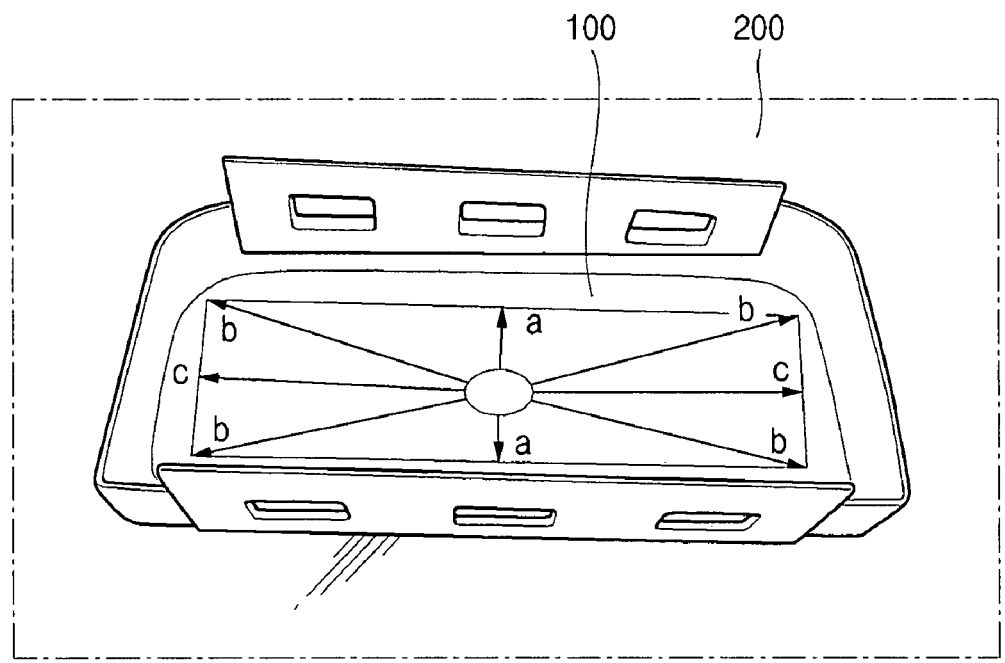
FIG. 3 shows an airbag for a front passenger seat for a vehicle according to an exemplary embodiment of the present invention being filled with material.

Referring to FIG. 3, when the TPO material is filled through a valve gate to the airbag door 100, the material filling speeds are set in the sequence of directions of c>b>a.

Figure 4C:
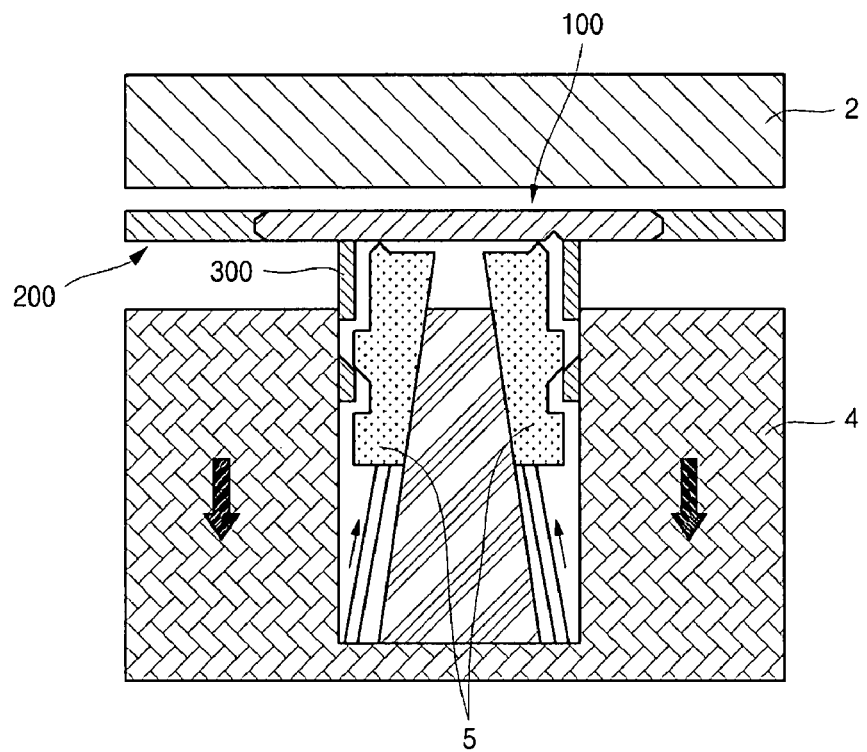

Referring to FIG. 4C, after the injection of materials to the airbag door 100 and the crash pad 200 is completed, the slide mold 5 moves forward so the airbag door 100 can be removed in a state that all the upper and the lower molds 2 and 4 and the slide mold 5 are retreated, at step ST300.

Operation of an airbag door of an airbag of a front passenger seat according to an exemplary embodiment of the present invention will be explained.

Figure 2:
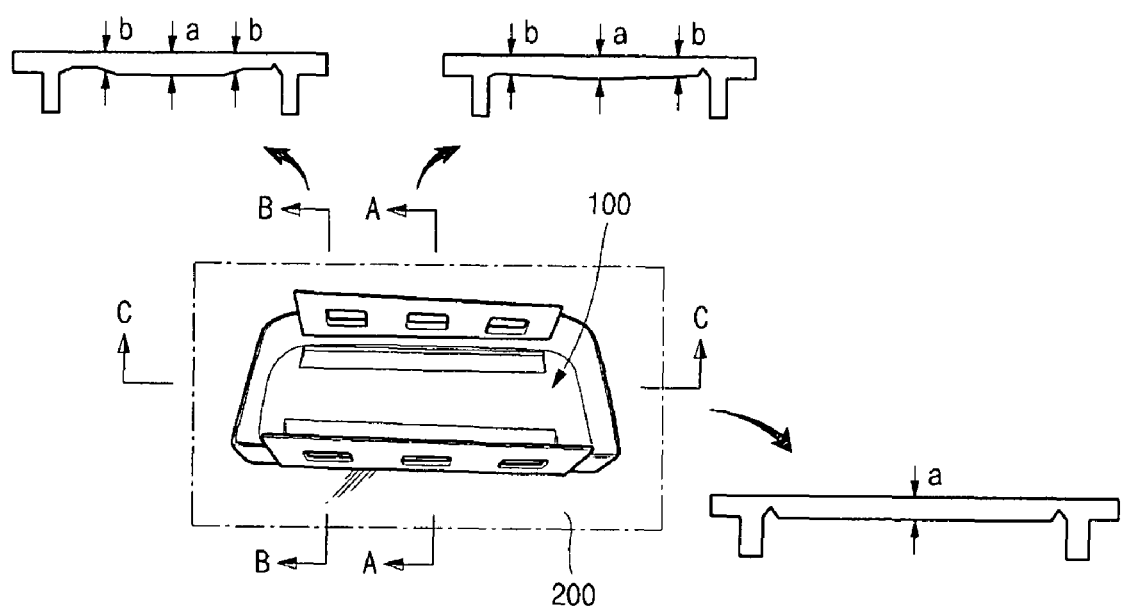
FIG. 2 is a cross sectional view of an airbag for a front passenger seat for a vehicle according to an exemplary embodiment of the present invention.

Referring to FIG. 1 and FIG. 2, the airbag door 100 according to an exemplary embodiment of the present invention is provided with the variable part 130, the thickness of which varies with respect to a lower center of an airbag door body. As shown in the cross-sectional view taken along line A-A, the airbag door 100 has a thickness a at a center thereof and a thickness b at both sides thereof, where b<a.

In addition, the thickness profile shown in the cross-sectional view taken along line B-B is identical to that shown in the cross-sectional view taken along line A-A. In the cross-sectional view taken along line C-C, the thickness is a.

Referring to FIG. 3, the airbag door 100 is formed by an injection mold with the material filling speeds in sequence of directions of c>b>a. Since the injection mold has different thicknesses as described above, the injection mold of the airbag door 100 is performed in a shape of an ellipse. If the airbag door 100 is formed in the method as described above, the stiffness of the airbag door 100 is enhanced, and at the same time the TPO material is injected only to the region of the airbag door 100.

An operation of an airbag door of an airbag of a front passenger seat is as follows: the airbag is deployed toward a front direction of an airbag housing by an inflator (not shown) at a lower part of the airbag door 100.

While the tear groove 110 is torn by the expansion force, the airbag door 100 is deployed into the cabin, and the slanted part 120 of the airbag door 100 serves the role of a hinge of the airbag door 100.

Since the airbag door 100 is completely rotated by the expansion force of the airbag, the airbag door 100 is not torn so that an occupant of the front passenger seat is prevented from being injured by broken pieces of the crash pad 200 or the airbag door 100 and can be safely protected from impact of a vehicle crash.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

As described above, in an airbag for a front passenger seat for a vehicle and a manufacturing method thereof according to the present invention, since the crash pad and the airbag door are integral to one another, material joining force is excellent, and the remaining stress at the coupling surface where the crash pad and the airbag door meet does not occur so that whitening and scratch do not occur.

Furthermore, the crash pad and the airbag door are simultaneously injection molded, so manufacture time is reduced.

What is claimed is:

1. An airbag apparatus, comprising:
   an airbag door configured to open during deployment of an airbag, the airbag door comprising a tear groove formed thereon to be torn during the deployment of the airbag, a slanted part formed at a side end thereof and a variable part whose thickness is varied with respect to a lower center thereof; and
   a crash pad integrally injection-molded with the airbag door and comprising an insertion part receiving and being in surface-contact with the slanted part of the airbag door to support the airbag when the airbag door opens, wherein the slanted part is in a convex shape and the insertion part is in a concave shape to be complementary to the slanted part.

2. The airbag apparatus of claim 1, wherein a sectional shape of the tear groove of the airbag door has a shape of "Λ" or "H".

3. The airbag apparatus of claim 1, wherein the airbag door comprises TPO material, and the crash pad comprises PPF material.

4. The airbag apparatus of claim 1, wherein the variable part is thickest at the lower center of the airbag door.

* * * * *